United States Patent Office 3,433,813
Patented Mar. 18, 1969

3,433,813
1-ADAMANTYL AND 1-ADAMANTYLMETHYL CARBONATES OF TESTOSTERONE AND SELECTED DERIVATIVES
George A. Boswell, Green Acres, Wilmington, Del., assignor to E. I. du Pont de Nemours and Company, Wilmington, Del., a corporation of Delaware
No Drawing. Filed Nov. 29, 1966, Ser. No. 597,555
U.S. Cl. 260—397.4                12 Claims
Int. Cl. C07c *169/24;* A61k *17/06*

ABSTRACT OF THE DISCLOSURE 1-adamantyl or 1-adamantylmethyl carbonates of testostosterone or related derivatives represented by the formula:

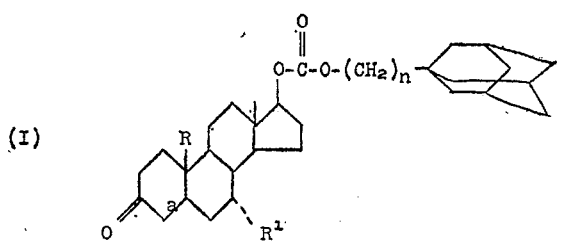

(I)

where R and $R^1$ are each hydrogen or methyl; $n$ is 0 or 1; and $a$ is a single or double bond; useful as pharmaceuticals.

Fluoroformates of testosterone or related derivatives represented by the formula:

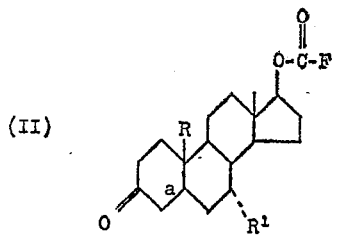

(II)

where R, $R^1$ and $a$ are as defined above; useful as pharmaceuticals.

The preparation of (II) from the corresponding testosterone by reaction with $COF_2$; the preparation of (I) from (II) by reaction with 1-adamantanemethanol or 1-adamantol; and the preparation of compounds of formula (I) where $n$ is zero from the corresponding testosterone and 1-adamantyl chloroformate.

BACKGROUND OF THE INVENTION

Field of the invention

This invention relates to new esters of testosterone and certain other 17β-hydroxy steroids having the testosterone structures. These esters are the 1-adamantyl or 1-adamantylmethyl carbonates of testosterone or related derivatives, i.e., they are characterized by the presence at the 17-carbon atom of the carbonyldioxy group

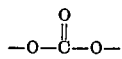

which is itself attached to a 1-adamantyl or 1-adamantylmethyl radical.

Description of the prior art

Prior art known to the inventor that may be pertinent to the background of the invention is listed as follows:

U.S.P. 3,056,727 to Allais et al., issued Oct. 2, 1962 discloses the cyclohexylcarbonates of testosterone and 19-nortestosterone. The cyclohexylcarbonate of testosterone has intense and prolonged androgenic activity.

French Patent 1,215 issued Apr. 2, 1962 to Roussel—UCLAF discloses testosterone cyclohexylmethyl carbonate (called testosterone hexahydrobenzyl carbonate in the patent) and its preparation from testosterone and cyclohexylmethyl chloroformate. The compound has intense and prolonged androgenic activity, as well as substantial anabolic activity.

French Patent 2,444 issued May 4, 1964 to Roussel—UCLAF discloses 19-nortestosterone cyclohexylmethyl carbonate (called 3-oxo-17β-hydroxy $\Delta^4$-estrene hexahydrobenzyl carbonate in the patent) and its preparation from 19-nortestosterone and cyclohexylmethyl chloroformate. The product possesses anabolic and androgenic activity.

U.S.P. 3,261,852 issued July 19, 1966 to Rapala discloses the 1-adamantoate esters of testosterone and 19-nortestosterone, which are said to be anabolic agents.

SUMMARY OF THE INVENTION

The new esters of this invention are represented by the general formula:

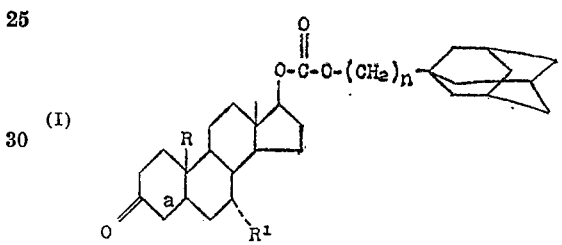

(I)

where R and $R^1$ are each hydrogen or methyl; $a$ is a single or double bond between the 4 and 5 carbon atoms of the steroid and when it is a single bond, the 5-hydrogen atom is in the $\alpha$ configuration; and $n$ is zero or one.

The invention also includes as new products the fluoroformates of testosterone or related derivatives, which are the intermediates in one of the methods used to prepare the carbonates of the invention. These fluoroformates have the formula:

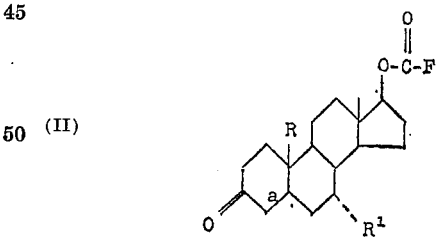

(II)

where R, $R^1$ and $a$ are defined as above.

DESCRIPTION OF THE PREFERRED EMBODIMENTS

The 17β-hydroxy steroids used as the starting materials in the preparation of the products of this invention are the following: testosterone, 7α-methyltestosterone, 19-nortestosterone, 7α-methyl-19-nortestosterone, dihydrotestosterone, 7α-methyldihydrotestosterone, dihydro-19-nortestosterone and 7α-methyldihydro-19-nortestosterone. For brevity, these starting materials are referred to herein as "testosterones" or as "the testosterone."

The esters of Formula I in which $n$ is 1, i.e., the 1-adamantylmethyl carbonates, are prepared by reacting the testosterone fluoroformate with 1-adamantanemethanol in accordance with the following equation, where "Ad" stands for the 1-adamantyl radical and the other symbols are those previously defined:

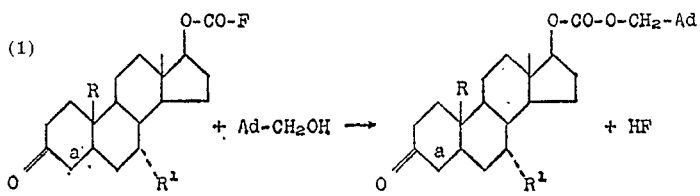

The process referred to in Equation 1 is carried out at a temperature in the range of 50–150° C., preferably 75–125° C., in an inert solvent such as an aromatic hydrocarbon (e.g., benzene, toluene, xylene) or a halohydrocarbon (e.g., methylene chloride, carbon tetrachloride, dichlorotetrafluoroethane, chlorobenzene). The reactant proportions are not critical, but it is preferred to use at least one mole of 1-adamantanemethanol per mole of testosterone fluoroformate, and an excess of the first reactant, e.g., up to 20 moles per mole, is advantageously used. The reaction is performed in the presence of a tertiary amine which serves as a promoter and also absorbs the hydrogen fluoride formed. Suitable acid acceptors are, for example, triethylamine, methyldicyclohexylamine, tri-n-hexylamine, pyridine, α-picoline, N-methylpiperidine, quinoline, and the like. The acid acceptor is used in at least equimolar amount relative to the fluoroformate, and preferably in excess thereover. Moisture is preferably excluded by the use of anhydrous ingredients and by carrying the process out under an inert atmosphere. Pressure and time are not critical. The products are isolated by conventional techniques.

The testosterone fluoroformates are themselves prepared by reacting the testosterone with carbonyl fluoride in accordance with the equation:

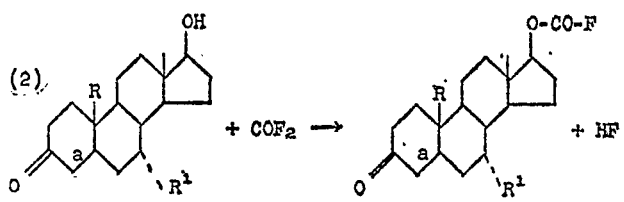

at a temperature in the range of 0–50° C., preferably 15–30° C., in an inert solvent such as those mentioned above in connection with the reaction of Equation 1. The carbonyl fluoride is desirably used in molar excess with respect to the testosterone, for example in a molar ratio between 2:1 and 20:1. The reaction conditions are, in general, the same as for the reaction of Equation 1.

The esters of Formula I where $n$ is zero, i.e., the 1-adamantyl carbonates, can be prepared by the method just described, but better results are obtained by an alternative procedure, which consists in reacting the testosterone with 1-adamantyl chloroformate in accordance with the equation:

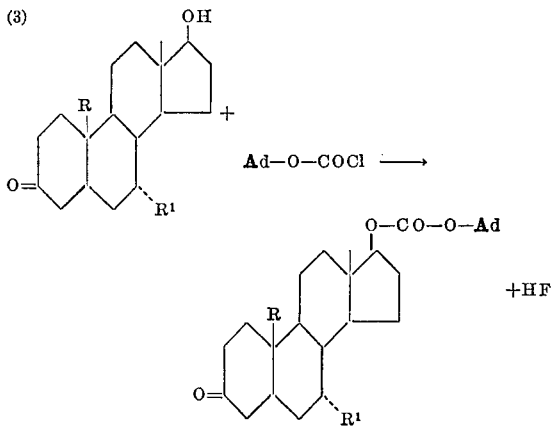

where all symbols are the same as in Equation 1. The process is conducted at a temperature in the range of 0–50° C., preferably 5–30° C., and in an inert solvent which may be any of those mentioned above. The reactant proportions are not critical but, as in the case of reaction of Equation 1, it is preferred to use at least one mole of 1-adamantyl chloroformate per mole of testosterone and preferably an excess, e.g., up to a molar ratio of 20:1. The reaction is carried out in the presence of a tertiary amine, used in at least equimolar amount relative to the testosterone and preferably in excess. Alternatively, and even preferably, the tertiary amine also serves as at least part of the solvent and reaction medium. The tertiary amines mentioned in connection with reaction of Equation 1 are suitable in this process also. The process conditions are similar to those used in the reaction of Equation 1.

The following examples illustrate the invention in greater detail, but are not to be considered limiting.

EXAMPLE 1

17β-hydroxy-4-estrene-3-one fluoroformate (or: 19-nortestosterone fluoroformate)

A solution of 19-nortestosterone (25.0 g.) in methylene chloride (100 ml.) was shaken with carbonyl fluoride (75 g.) in a pressure vessel at 20±2° C. for 10 hours. The reaction vessel was then vented, swept out with nitrogen, and its contents were transferred to a separatory funnel. The methylene chloride solution was washed with water, then with a saturated salt solution, dried over anhydrous magnesium sulfate and evaporated to dryness under reduced pressure. The residual clear, viscous syrup solidified on trituration with hexane. The crude product was recrystallized from hexane to afford 17β-hydroxy-4-estrene-3-one fluoroformate (23.4 g.) as crystals melting at 83–83.5° C., $[\alpha]_D^{23}$+34° (c. 1.47, CHCl$_3$).

*Analysis.*—Calcd. for $C_{19}H_{25}FO_3$: C, 71.3; H, 7.85; F, 5.92. Found: C, 71.42; H, 7.84; F, 5.88. Infrared:

$$\lambda_{max.}^{Nujol}$$

5.50 (—COF), 6.02 (C–3 conj. C=O), 6.20 (conj. C=C) and 8.0μ (—O—COF). Ultraviolet:

$$\lambda_{max.}^{EtOH}$$

240 (ε=18,000) and 312 mμ (ε=79).

The fluoroformates of 17β-hydroxyestrane-3-one, 17β-hydroxy-7α-methylestrane-3-one and 17β-hydroxy-7α-methyl-4-estrene-3-one can be prepared in the same manner, starting with dihydro-19-nortestosterone, 7α-methyl-dihydro-19-nortestosterone and 7α-methyl-19-nortestosterone, respectively.

EXAMPLE 2

17β-hydroxy-4-androstene-3-one fluoroformate (or: testosterone fluoroformate)

A solution of testosterone (50 g.) in methylene chloride (100 ml.) was shaken with carbonyl fluoride (150 g.) in a pressure vessel at 20±2° C. for 10 hours. The reaction mixture was processed as described in Example 1 and the crude product was purified by crystallization from hexane. There was thus obtained 45.5 g. of 17β-hydroxy-4-androstene-3-one fluoroformate, M.P. 104–106° C., $[\alpha]_D^{23}+86°$ (c. 2.33, CHCl$_3$).

*Analysis.*—Calcd. for $C_{20}H_{27}FO_3$: C, 71.7; H, 8.13; F, 5.68. Found: C, 72.06; H, 8.03; F, 5.74. Infrared:

$$\lambda_{max.}^{Nujol}$$

5.50 (—COF), 6.0 (C–3 conj. C=O), 6.22 (conj. C=C) and 8.0μ (—O—COF). Ultraviolet:

$$\lambda_{max.}^{EtOH}$$

238 mμ ($\epsilon$=16,600).

The fluoroformates of 17β-hydroxyandrostane-3-one, 17β-hydroxy-7α-methylandrostane-3-one and 17β-hydroxy-7α-methyl-4-androstene-3-one can be prepared in the same manner, starting with dihydrotestosterone, 7α-methyldihydrotestosterone, and 7α-methyltestosterone, respectively.

EXAMPLE 3

17β-hydroxy-4-estrene-3-one 1'-adamantylmethyl carbonate (or: 19-nortestosterone 1'-adamantylmethyl carbonate)

A solution of 19-nortestosterone fluoroformate (1.0 g.) and 1-adamantanemethanol (10.0 g.) in dry benzene (75 ml.) containing dry pyridine (0.5 ml.) was heated at reflux under nitrogen for 24 hours, during which time a solid (pyridine hydrofluoride) formed in the reflux condenser. The reaction mixture was transferred to a separatory funnel and agitated vigorously with 250 ml. of water. The aqueous phase was drawn off and the remaining organic phase was washed with water, then with saturated salt soltuion, dried over anhydrous magnesium sulfate and evaporated under reduced pressure. The residual waxy solid was dissolved in hexane and the solution adsorbed onto a column of magnesium silicate chromatographic absorbent. Elution with hexane, followed by crystallization of the solid product thus obtained from hexane, afforded 6.8 g. of recovered 1-adamantanemethanol as long colorless needless. Continued elution with hexane containing 10% of acetone brought off a colorless oil which crystallized when triturated with hexane. The crystalline cuts were combined and recrystallized from a mixture of hexane and petroleum ether (B.P. 30–60° C.) to give, as the first crop, 0.646 g. of 17β-hydroxy-4-estrene-3-one 1'-adamantylmethyl carbonate. An analytical sample recrystallized from petroleum ether melted at 142.5–143.5° C., $[\alpha]_D^{24}+42°$ (c. 1.65, CHCl$_3$).

Anal.—Calcd. for $C_{30}H_{42}O_3$: C, 77.2; H, 9.07. Found: C, 77.25; H, 8.91. Infrared:

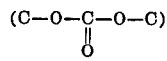

5.74 (—OCOO), 5.95 (conj. C–3 C=O), 6.08 (conj. C=C) and 8.0μ

(C—O—C—O—C)
        ‖
        O

Ultraviolet:

$$\lambda_{max.}^{EtOH}$$

239 ($\epsilon$=17,200) and 310 Mμ ($\epsilon$=78).

The proton n-m-r spectrum supported the assigned structure.

The 1-adamantanemethanol used in this example may be prepared as described by Stetter et al. in Ber. 92, 1629 (1959).

Using the same procedure, 17β-hydroxyestrane-3-one 1'-adamantylmethyl carbonate can be prepared from 17β-hydroxy-estrane-3-one fluoroformate; 17β-hydroxy-7α-methylestrane-3-one 1'-adamantylmethyl carbonate from 17β-hydroxy-7α-methyl-estrane-3-one fluoroformate; and 17β-hydroxy-7α-methyl-4-estrene-3-one 1'-adamantylmethyl carbonate from 17β-hydroxy-7α-methyl-4-estrene-3-one fluoroformate.

EXAMPLE 4

17β-hydroxy-4-androstene-3-one 1'-adamantylmethyl carbonate (or: testosterone 1'-adamantylmethyl carbonate)

A solution of testosterone fluoroformate (2.0 g.) and 1-adamantanemethanol (5.62 g.) in dry benzene (75 ml.) containing dry pyridine (0.5 ml.) was heated at reflux under nitrogen for 30 hours, during which time a sublimate of pyridine hydrofluoride formed in the reflux condenser. The reaction mixture was processed as described in Example 3. The infrared spectrum of the crude product showed that a good conversion of the fluoroformate to the carbonate had been achieved.

The crude product was adsorbed from hexane onto a magnesium silicate chromatographic absorbent. Elution with hexane afforded 3.1 g. of recovered 1-adamantanemethanol. Continued elution with hexane containing 5% of acetone and recrystallization of the eluted solid from hexane gave colorless crystals (1.5 g.) of 17β hydroxy-4-androstene-3-one 1'-adamantylmethyl carbonate, M.P. 158–159° C., $[\alpha]_D^{24}+79°$ (c. 1.32, CHCl$_3$).

Anal.—Calcd. for $C_{31}H_{44}O_4$: C, 77.5; H, 9.23. Found: C, 77.47; H, 9.17. Infrared:

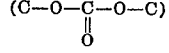

5.75 (—OCOO), 5.99 (conj. C-3 C=O), 6.18 (conj. C=C) and 8.0 μ

(C—O—C—O—C)
        ‖
        O

Utraviolet:

$$\lambda_{max.}^{EtOH}$$

240 mμ ($\epsilon$=16,500).

By the same procedure, there can be prepared: 17β-hydroxyandrostane-3-one 1'-adamantylmethyl carbonate from 17β-hydroxyandrostane-3-one fluoroformate; 17β-hydroxy-7α-methylandrostane-3-one 1'-adamantylmethyl carbonate, from 17β-hydroxy-7α-methylandrostane-3-one fluoroformate; and 17β-hydroxy-7α-methyl-4-androstene-3-one 1'-adamantylmethyl carbonate, from 17β-hydroxy-7α-methyl-4-androstene-3-one fluoroformate.

EXAMPLE 5

17β-hydroxy-4-estrene-3-one 1'-adamantyl carbonate (or: 19-nortestosterone 1'-adamantyl carbonate)

This carbonate was prepared by a reaction of 19-nortestosterone with 1-adamantyl chloroformate. The latter (M.P. 52–53° C.) was prepared from 1-adamantol and phosgene as described by Haas et al. in J. Am. Chem. Soc. 88, 1988 (1966).

To a stirred solution of 19-nortestosterone (6.0 g.) in anhydrous pyridine (35 ml.) cooled to 10° C. was added dropwise a solution in dry benzene (75 ml.) of the 1-adamantyl chloroformate obtained from 3.8 g. of 1-adamantol. After the addition was completed, the mixture was allowed to warm to room temperature and to stand overnight. During this time a copious amount of pyridine hydrochloride precipitated. The reaction mixture was then processed essentially as described in Example 3 to give a syrupy product, the infrared spectrum of which showed that good conversion to the carbonate had been achieved. This crude product was adsorbed from a small volume of benzene onto a magnesium silicate chromatographic absorbant 150 g.). Elution with hexane containing 5% of acetone gave 0.4 g. of 1-adamantol. Further elution with hexane containing 7.5% of acetone returned first the crystalline carbonate, then a mixture of carbonate and unreacted 19-nortestosterone. The carbonate fractions were crystallized from acetone hexane to give 3.47 g. of 17β-hydroxy-4-estrene-3-one 1'-adamantyl carbonate, M.P. 166–168° C. An analytical sample was recrystallized from the same solvent pair to furnish the product as colorless blades, M.P. 167° C., $[\alpha]_D^{24}+35°$ (c. 1.43, CHCl$_3$).

Anal.—Calcd. for $C_{29}H_{40}O_4$: C, 76.9; H, 8.91. Found: C, 77.13; H, 8.98. Infrared:

$\lambda_{max.}^{Nujol}$ 5.78 (—OCOO), 6.01 (conj. C–3 C=O), 6.20 (conj. C=C) and 8.0μ

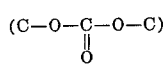

Ultraviolet:

$\lambda_{max.}^{EtOH}$ 238 (ε=18,400) and 312 mμ (ε=75).

Using the same procedure, other esters of this invention can be obtained by reaction of 1-adamantyl chloroformate with the appropriate testosterone. Thus, 17β-hydroxyestrane-3-one 1'-adamantyl carbonate is obtained from 19-nordihydrostestosterone; 17β-hydroxy-7α-methylestrane-3-one 1'-adamantyl carbonate from 7α-methyl-19-nordihydrotestosterone; 17β-hydroxy-7α-methyl-4-estrene-3-one 1'-adamantyl carbonate from 7α-methyl-19-nortestosterone; 17β-hydroxy - 4 - androstene-3-one 1'-adamantyl carbonate from testosterone; 17β-hydroxyandrostane-3-one 1'-adamantylcarbonate from dihydrotestosterone; 17β-hydroxy-7α-methylandrostane-3-one 1'-adamantyl carbonate from 7α-methyldihydrotestosterone; and 17β - hydroxy-7α-methyl-4-androstene-3-one 1'-adamantyl carbonate from 7α-methyltestosterone.

The products of this invention possess marked pharmacological activity. The 1-adamantyl and 1-adamantylmethyl carbonates of testosterone and related derivatives have an androgenic-anabolic action and they can be used in place of testosterone and its simple esters in instances where such an action is desired. Since these compounds are very soluble in oil bases and have a prolonged duration of action due to the slow hydrolysis of the "bulky" carbonate to release the active species, a single massive dose is still effective many weeks after injection, thus behaving in the manner of a true implant. The 1-adamantyl and 1-adamantylmethyl carbonates of 19-nortestosterone and related derivatives are anabolic-androgenic agents with a favorable anabolic to androgenic ratio and are emiently suitable in those instances where an intense and prolonged anabolic effect is needed. For example, these carbonates are useful to promote weight gain, to increase muscular strength, and to promote a sense of well-being in mammals.

The fluoroformates of testosterone, 19-nortestosterone and related derivatives are characterized by having anabolic-androgenic activity in mammals and birds and thus are useful in male gonadal replacement therapy in prepuberal and postpuberal castrates, in pituitary dwarfism, etc. The fluoroformates are potent inhibitors of pituitary secretion and therefore can be used to regulate estrus in mammals, e.g., in valuable domestic animals. In addition, these compounds have an antifertility effect in mammals and hence are agents for controlling animal populations. 19-nortestosterone fluoroformate has a favorable anabolic to androgenic ratio, making it useful to promote growth and weight gain in valuable domestic animals.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Compounds represented by the formula selected from the group consisting of

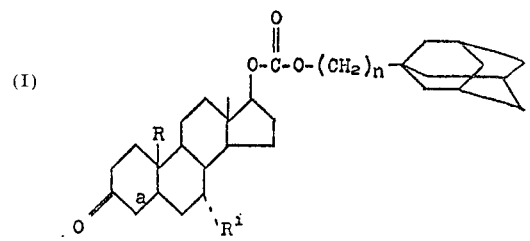

wherein R and R$^1$ are each selected from the class consisting of hydrogen and methyl; $a$ represents a bond between carbon atoms 4 and 5 of the steroid nucleus selected from the class consisting of a single bond and a double bond, and when $a$ is a single bond the 5-hydrogen is in the α configuration; and $n$ is a number selected from the class consisting of zero and 1; and

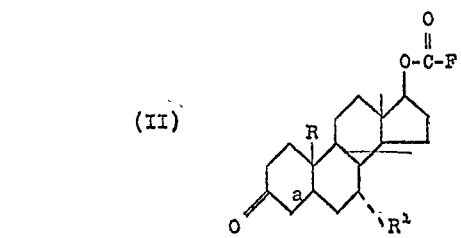

wherein R, R$^1$ and $a$ are defined as above.

2. Compounds of claim 1 represented by the formula

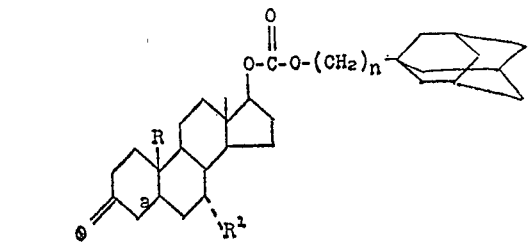

wherein R, R$^1$, $a$ and $n$ are defined as in claim 1.

3. Compounds of claim 1 represented by the formula

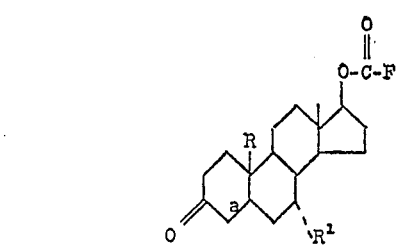

wherein R, R$^1$ and $a$ are defined as in claim 1.

4. Compounds of claim 2 wherein $n$ is zero.
5. Compounds of claim 2 wherein $n$ is 1.
6. Compounds of claim 2 wherein R is hydrogen.
7. Compounds of claim 2 wherein R is methyl.
8. The compound of claim 2 represented by the formula

9. The compound of claim 2 represented by the formula
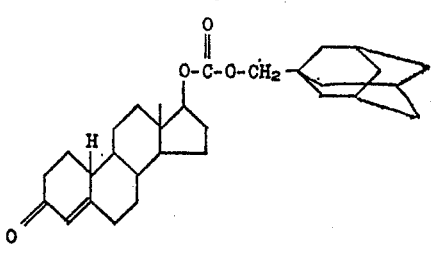
10. The compound of claim 2 represented by the formula
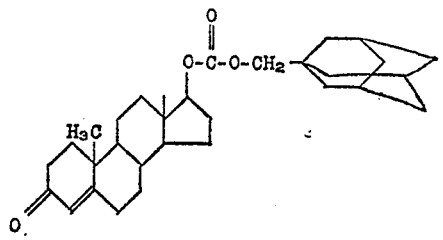
11. The compound of claim 3 represented by the formula
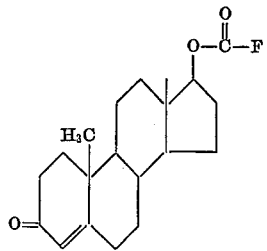
12. The compound of claim 3 represented by the formula
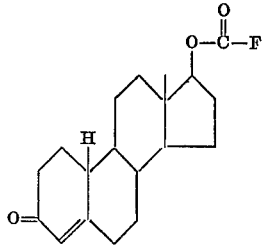
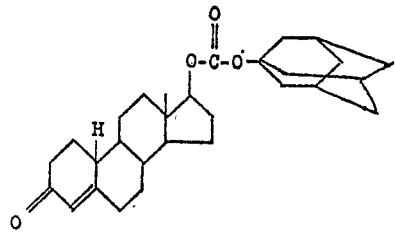
References Cited
UNITED STATES PATENTS
3,056,727  10/1962  Allais et al.
3,261,852  7/1966  Rapala.
HENRY A. FRENCH, *Primary Examiner.*
U.S. Cl. X.R.
260—999